3,390,212
PROCESS FOR MAKING LIGHTWEIGHT
FIRED CERAMIC BODIES
Russell T. Stelle, 6 N. Walnut St.,
Brazil, Ind. 47834
No Drawing. Continuation-in-part of application Ser. No. 372,108, June 2, 1964. This application Nov. 14, 1966, Ser. No. 593,754
2 Claims. (Cl. 264—44)

ABSTRACT OF THE DISCLOSURE

A process for making lightweight ceramic bodies having superior physical properties consisting of grinding and mixing sandy and plastic clay, adding an oil-water emulsion in the amount of from 5 to 30% of the weight of the clay, thoroughly mixing the clay-water-oil emulsion mix, shaping the ceramic mix containing the oil-water emulsion by extrusion, by pressing, by hand, or by any other convenient process and firing the resultant tile shapes.

---

This invention relates to a novel method of manufacturing ceramic bodies and more particularly, to a method of manufacturing lightweight ceramic bodies of uniform density, and is a continuation-in-part of my pending application Ser. No. 372,108, filed June 2, 1964, and now abandoned.

The problem of making lightweight ceramic bodies, such as bricks or tile, has existed in the ceramic industry for decades. One method of solving this problem has been to employ a lightweight aggregate such as diatomaceous earth or, more recently, vermiculite in admixture with the clay. While the resulting ceramic body was indeed somewhat lighter in weight, it had certain undesirable properties such as lowered impact strength, and lower breaking strength. Both of these defects were attributable to the lack of uniformity of the finished product produced by the presence of a lightweight aggregate itself. Furthermore, there was an inherent limit to the decrease in weight achieved by their use since only a small percent of the could be replaced if the ceramic body were to maintain its coherence after firing.

Another method of forming lightweight ceramic bodies has been to add materials to the clay which would burn out during the firing process. For instance, wood chips or sawdust were mixed with the clay powder prior to forming the shaped ceramic mass. Then, during firing, the high temperatures used ignited the combustible material which eventually vaporized substantially completely, leaving only a small amount of ash and, more important, a void in the fired ceramic body where the combustible material had been. This process too had certain drawbacks. In the first place, uniform mixing of such disparate materials as clay and wood chips was unattainable without the use of extremely expensive equipment. Secondly, the fired ceramic body was usually not much lighter since the combustible material replaced water which was driven off during a conventional firing process. Thirdly, many of the cheap combustible materials when used in relatively large quantities gave an irregular pattern of voids in the ceramic body, resulting again in a non-uniform body of decreased impact or breaking strength.

It is an object of this invention to provide a method of making lightweight ceramic bodies, which method is economical to operate, requires only conventional equipment and utilizes cheap, readily available starting materials. It is also an object of this invention to provide lightweight ceramic bodies of more uniform quality than hitherto possible at a manufacturing cost comparable to that for ceramic bodies of conventional density. Other objects will become apparent from the following description.

The process provided by this invention comprises mixing clay with a homogenized stable oil-water emulsion in which all the oil micelles are capable of passing a 30 mesh screen, forming the resulting mixture into a desired shape and then firing the shaped ceramic mass. In the above process, it is most necessary in the first place that the oil droplets in the oil-water emulsion be of micellular dimensions; i.e., of a size capable of passing a 30 mesh screen; and secondary that the micellular oil particles do not coalesce to any appreciable extent while the oil-water emulsion is being mixed with the clay, or while the emulsion-water-clay mixture is being shaped.

In the above process, the oil-water emulsion replaces part to all of the water usually employed in the conventional mixing and shaping processes used to form shaped ceramic articles from clay and water. In addition, the micellular oil particles displace from 5–20% of the clay particles themselves which would have been present in a conventional clay-water matrix. This replacement takes place because the oil particles are of comparable size to the clay particles and this dimensional similarity enables the oil micelle to replace a solid clay particle in the water-clay matrix. Later on, during the firing process, the micellular oil droplets in the clay matrix are burned out and the water in the matrix is removed by evaporation. The resulting fired ceramic body then contains a series of microscopic voids left by the burning out of the oil in addition to the voids left by evaporation of the water. These latter voids would be left in a conventional firing process but the voids left by the burning out of the oil are in addition to these voids. The voids left by the burning out of the oil can amount to from 5 to 20% of the total volume of the fired ceramic mass which as a consequence, weighs from 5 to 20% less than a conventionally fired ceramic shape, formed from just clay and water.

Needless to say, if the oil is not truly emulsified in the water prior to mixing with the clay, or if the emulsion breaks down during the process of mixing the emulsion with the clay, or of shaking the emulsion-clay mixture, the resulting clay-water matrix will have large globs of oil distributed unevenly throughout the mass. These globs of oil will, on burning out during firing, leave large irregular vacancies (as contrasted with the uniform microscopic voids left behind by burning out the emulsified oil micelles). Shaped ceramic masses containing such macroscopic vacancies tend to collapse on firing, and the resulting fired ceramic shapes are most unsatisfactory.

As can be seen from the above discussion any tendency of the oil particles to coalesce and form substantial quantities of droplets having dimensions ranging from greater than 30 mesh on the low side up to macroscopic globules on the high side, will defeat the end result of my novel process, which is as previously stated, a lightweight fired ceramic body having a strength comparable to that of a conventionally fired ceramic body of the same shape. Further, the presence of such coalesced macroscopic oil droplets will result in imperfect and misshaped fired bodies having fissures, holes, the like with a tendency to crumble under pressure. Surprisingly, the lightweight fired ceramic bodies produced by the process of this invention, even those which are 20% lighter than conventionally produced ceramic bodies, having as they do a series of uniform microscopic voids, have shown no tendency to collapse during the firing process when extremely high temperatures are encountered.

The clays which I employ in my novel process are those which have been employed in the manufacture of ceramic bodies throughout the years, and include inert clays, plastic clays and mixtures of these types of clay. The exact nature of the clay employed is not critical and my novel process is adaptable for use in all processes which produce fired ceramic shapes since the oil-water emulsion replaces all or part of the water used in the conventional mixing and shaping process. The precise nature of the oil used in the oil-water emulsion is also not critical provided only that the oil is combustible and has a flash point above 160° F. and below 1700° F. The oil employed should, however, have a high B.t.u. content, say of the order of 150,000–170,000 B.t.u.'s per gallon, although oils with higher and lower B.t.u. ratings per gallon are fully operative. A preferred oil for use in my novel process is #2 fuel oil which has a rating of about 160,000 B.t.u.'s per gallon, is readily available in large quantities and is relatively inexpensive.

The emulsifying agents employed in forming the oil-water emulsions useful in my invention include both ionic and non-ionic surfactants including alkali metals, ammonium and amine salts of long chain aliphatic carboxylic and sulfonic acids, of alkyl aryl sulfonic acids; alkyl aryl polyether alcohols, alkyl esters of sodium sulfosuccinic acid, sodium and potassium salts of sulfate esters of alkyl phenoxy polyoxy ethylene ethanol, distearyl dimethyl ammonium chloride, polyoxy ethylene sorbitan monolaurate and other surfactants of the type listed in "Soap and Chemical Specialties," December 1957, January–April 1958, by John W. McCutcheon.

In carrying out my novel process, a mixture of clays, including both inert, sandy clay and plastic clay containing water bound both chemically and physically, is ground and mixed with sufficient water to render the mass plastic. Next, an oil-water emulsion amounting to from 5–30° of the weight of the clay mix is added. Alternatively, the oil-water emulsion can be added initially to supply all the water needed in forming the plastic ceramic mass. The ceramic mix containing the oil-water emulsion is then shaped by extrusion, by pressing, by hand or by any other convenient process, and the shapes thus produced are fired. The amount of emulsion needed depends both upon the percent of oil in the emulsion and on the B.t.u. rating of the oil, it being desirable that the oil be present in a quantity sufficient to furnish 3,000,000 B.t.u.'s of heat per ton of clay mix during the firing process.

The use of the oil-water emulsion in place of water in the ceramic mix prior to firing has the added advantage of providing a uniform internal source of heat provided by the burning oil during the firing process. This internal heating is superior to that obtained with any of the other combustible materials heretofore used in admixture with clay. Furthermore, the use of a uniformly dispersed internal heat source gives a more even and controlled heat throughout the shaped ceramic mass during the firing process since the amount of internal heat can be controlled by the number of B.t.u.'s per ton which the oil of the water-oil emulsion can furnish. As has been previously pointed out, the number of B.t.u.'s can, in turn, be controlled by the quantity of oil supplied to the ceramic mass as an oil-water emulsion and by the B.t.u. rating of the oil.

More specifically, my invention is carried out as follows: 1000 lbs. of sandy clay and 1000 lbs. of a plastic clay were thoroughly ground and mixed. 40 gallons of a 50% emulsion of #2 oil and water containing in addition 0.5% of potassium stearate as an emulsifying agent, were added. The oil micelles were capable of passing through a 30 mesh screen. The #2 fuel oil has a flash point or ignition point at about 160° F. The clay powder and oil-water emulsion were thoroughly mixed and the mixture extruded at about 120° F. into bars 4 inches wide and ½ inch high, which were cut into 4" x 4" tile shapes.

The green tiles were then fired by slowly heating to a temperature of about 2200° F. over a period of 90 hours. The resulting tile is of uniform appearance, has a fine grain structure, weighs about 10% less than a similar tile manufactured with water only added to the dry clay mix prior to extrusion, and has the physical properties and characteristics shown in Table I.

TABLE I

| | |
|---|---|
| Comprehensive strength | 2000 p.s.i. |
| Distortion tolerances | Within ASTM. |
| Face dimension variation | Within ASTM. |
| Bed depth variation | Within ASTM. |
| Freeze-thaw | 100 times. |
| Absorption | 6%. |
| Color and texture (body) | Production grade. |
| Glazing | Excellent. |
| Face blisters | None. |
| Face chips | Within ASTM. |
| Autoclave test | Within ASTM. |

The lightweight fired ceramic bodies produced by the process of this invention are stronger and more uniform in quality than those produced by the admixture of solid combustible material, such as sawdust with clay powder and water, prior to firing. The greater strength and uniformity is undoubtedly attributable to the microvoids produced by burning the micellular oil droplets which have replaced part of the clay in the ceramic matrix.

While the invention has been disclosed and described in some detail in the drawings and foregoing description, they are to be considered is illustrative and not restrictive in character, as other modifications may readily suggest themselves to persons skilled in this art and within the broad scope of the invention, reference being made to the appended claims.

I claim:
1. The process of making lightweight fired ceramic bodies which comprises mixing dry clay powder with from about 5% to about 30% by weight of an oil-water emulsion stabilized with an emulsifying agent and with sufficient added water to render the ceramic mass plastic, said emulsified oil substantially being present at all times during said mixing process in the form of micellular droplets capable of passing a 30 mesh screen, said oil having a "flash point" in the range of 160° F.–1700° F. and a B.t.u. rating of 130,000 to 170,000, and said micellular oil droplets constituting from about 5% to about 50% of said oil-water emulsion, forming the thus formed plastic ceramic mass into desired shapes and firing said shaped ceramic mass, whereby a plurality of substantially uniform microscopic voids are produced in the fired ceramic body.

2. The process of claim 1 in which No. 2 fuel oil is added in the form of an oil-water emulsion at the rate of 20 gallons of No. 2 fuel oil per ton of dry clay mix.

References Cited

FOREIGN PATENTS 805,844 12/1958 Great Britain.

OTHER REFERENCES

Alexander: Colloid Chemistry, vol. VI, 1946, Reinhold Publishing Corporation, New York, N.Y., page 271.

ROBERT F. WHITE, *Primary Examiner.*

A. R. NOE, J. A. FINLAYSON, *Assistant Examiners.*